July 22, 1969            G. CLOSE            3,456,763
LIFT UNLOADER GROCERY CART
Filed Jan. 10, 1967            11 Sheets-Sheet 1
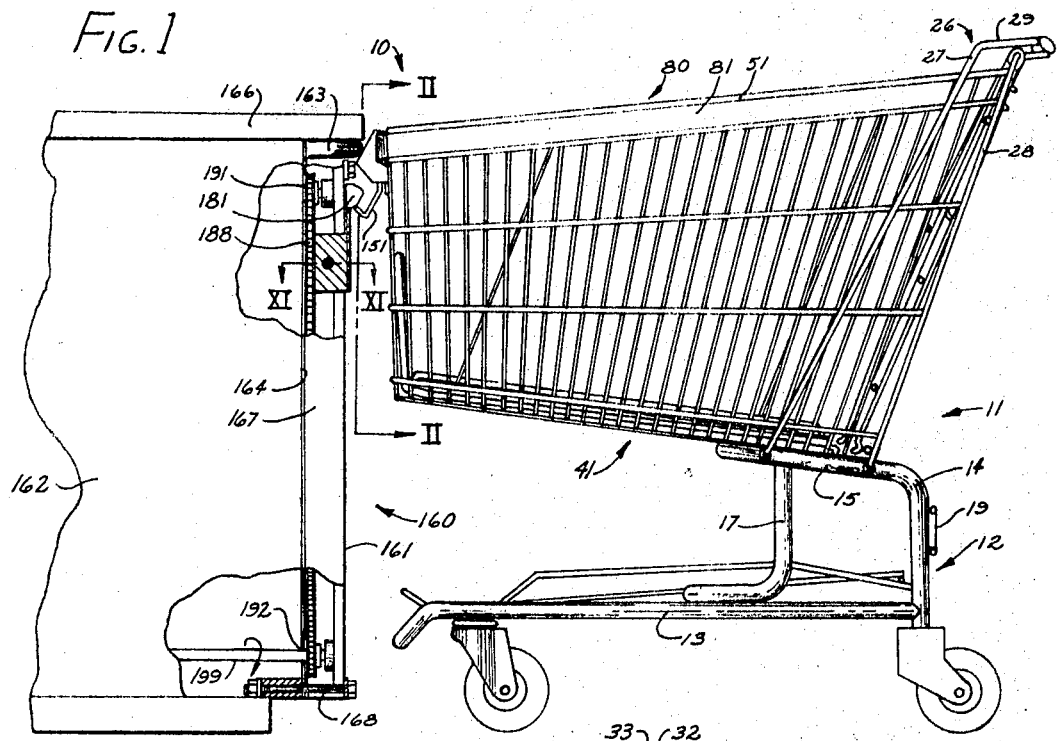
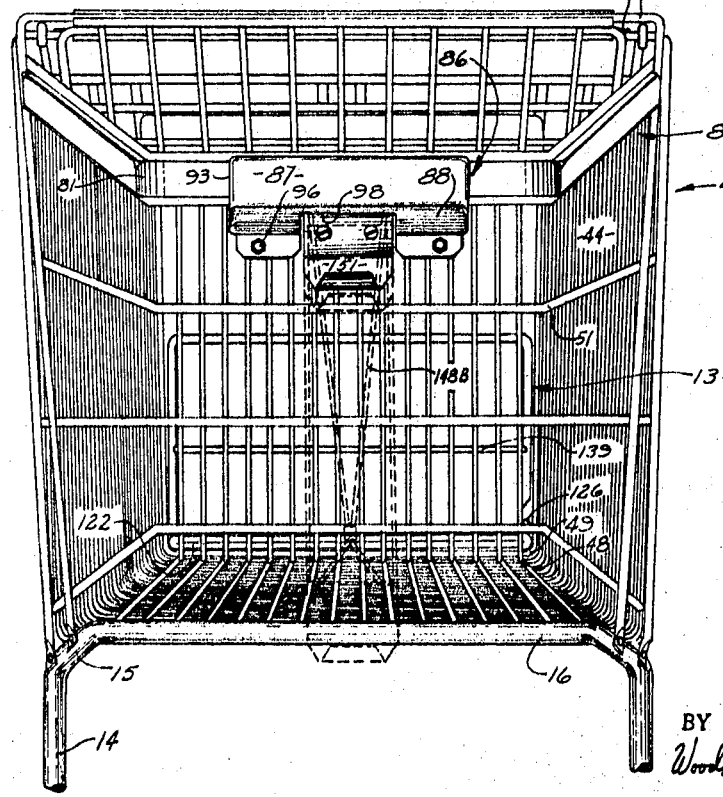
INVENTOR.
GARTH CLOSE
BY
*Woodhams, Blanchard & Flynn*
ATTORNEYS July 22, 1969  G. CLOSE  3,456,763
LIFT UNLOADER GROCERY CART
Filed Jan. 10, 1967  11 Sheets-Sheet 3
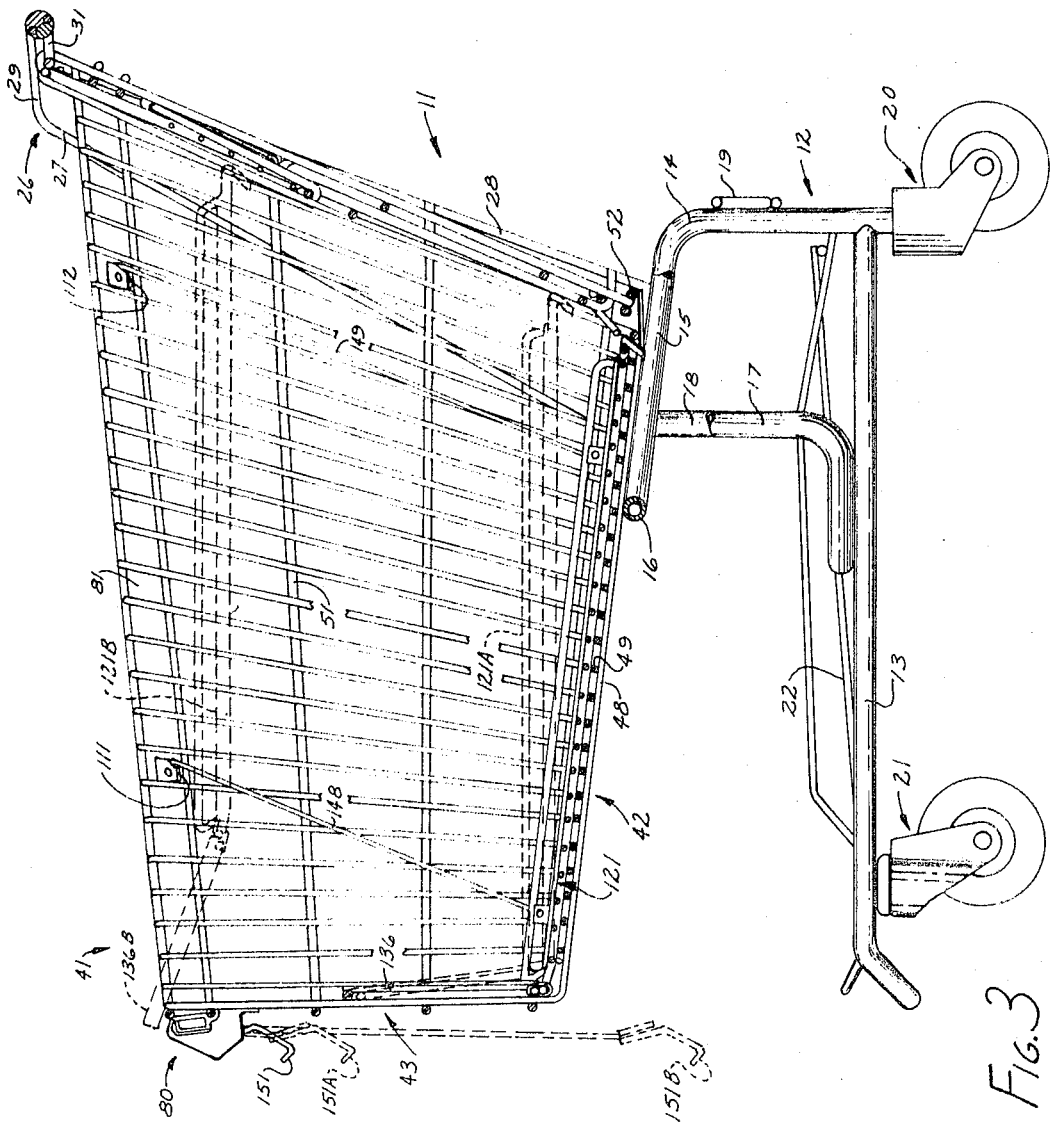
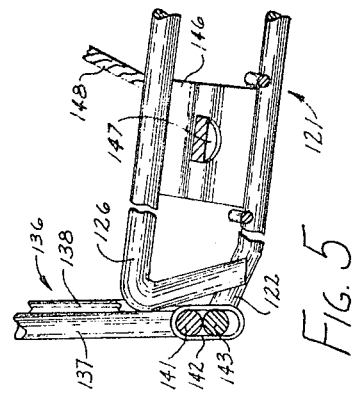
INVENTOR.
GARTH CLOSE
BY
Woodhams, Blanchard & Flynn
ATTORNEYS

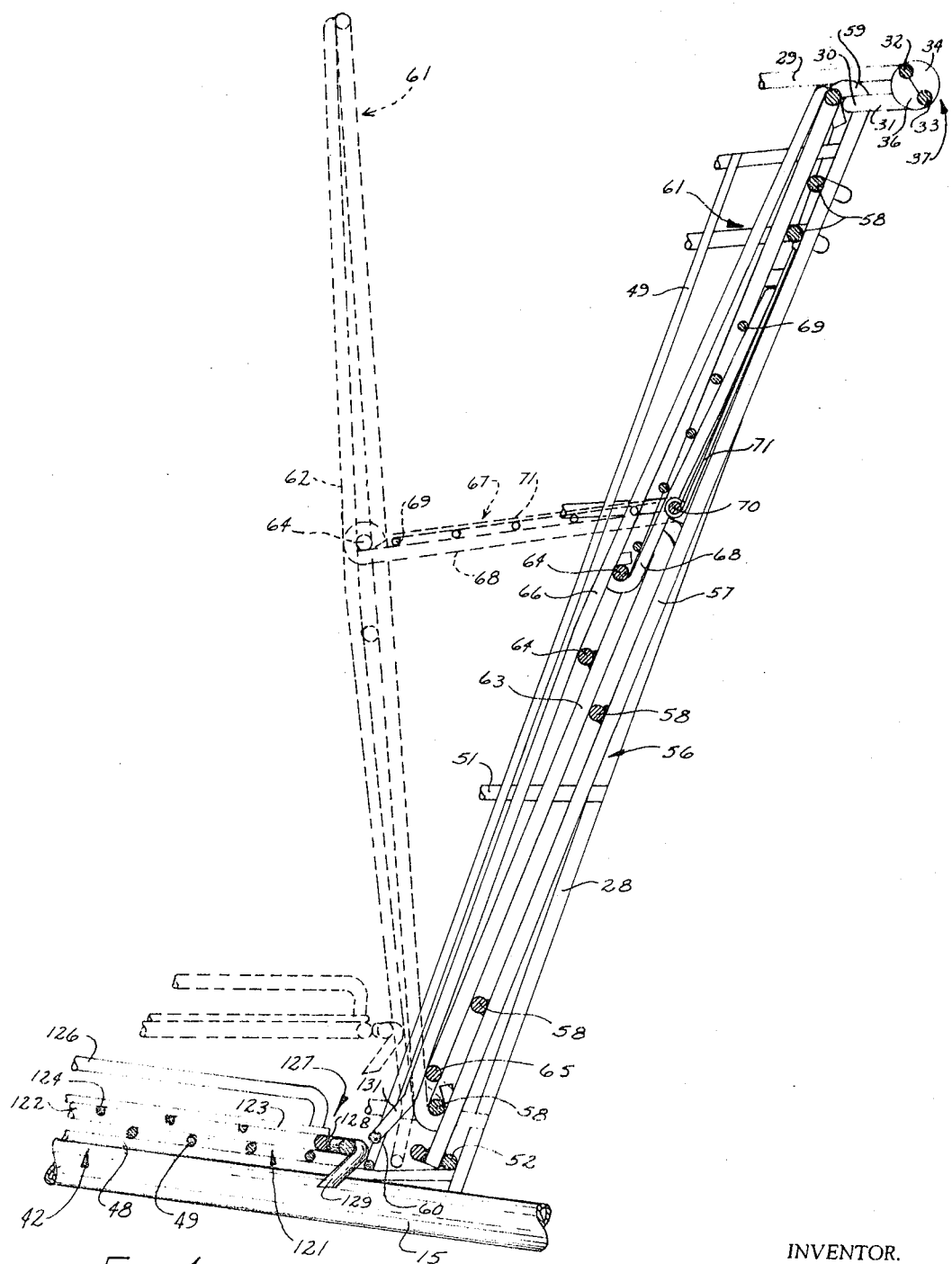

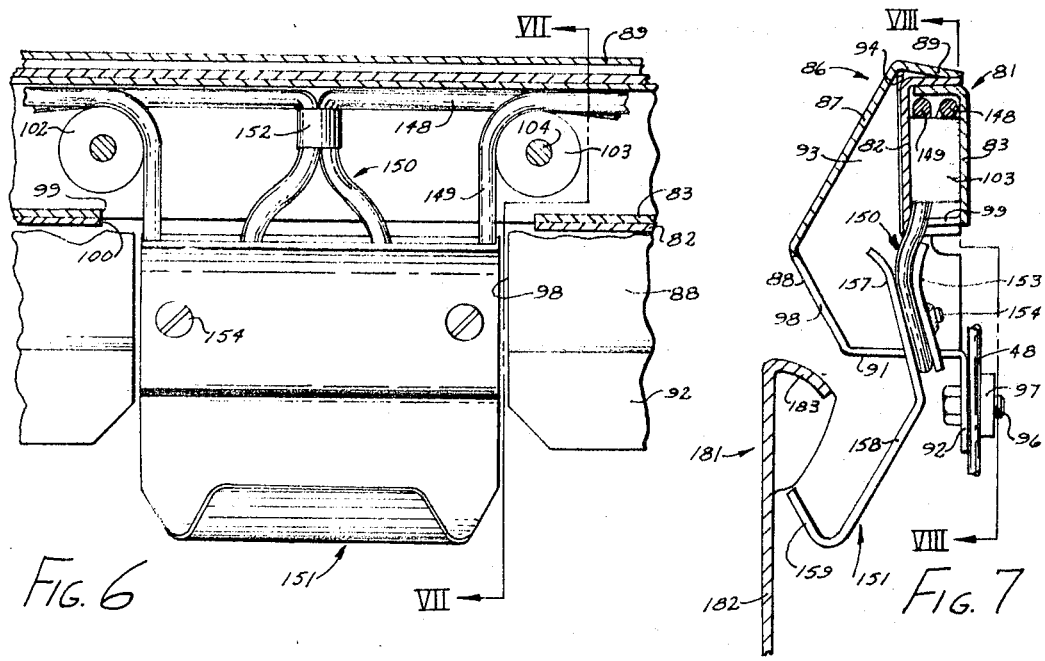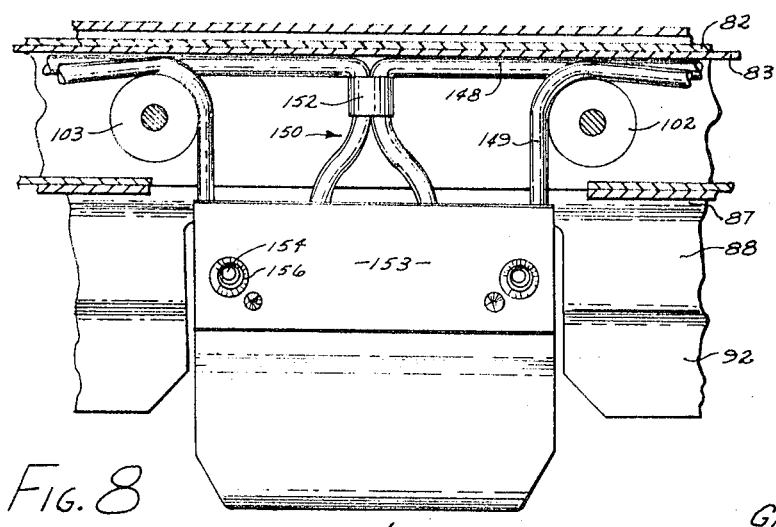

July 22, 1969  G. CLOSE  3,456,763
LIFT UNLOADER GROCERY CART
Filed Jan. 10, 1967  11 Sheets-Sheet 6

INVENTOR.
GARTH CLOSE
BY
Woodhams, Blanchard & Flynn
ATTORNEYS

July 22, 1969

G. CLOSE 3,456,763

LIFT UNLOADER GROCERY CART

Filed Jan. 10, 1967

INVENTOR.
GARTH CLOSE
BY
Woodhams, Blanchard & Flynn
ATTORNEYS

July 22, 1969  G. CLOSE  3,456,763
LIFT UNLOADER GROCERY CART
Filed Jan. 10, 1967  11 Sheets-Sheet 8

INVENTOR.
GARTH CLOSE
BY
Woodhams, Blanchard & Flynn
ATTORNEYS

July 22, 1969

G. CLOSE 3,456,763

LIFT UNLOADER GROCERY CART

Filed Jan. 10, 1967

INVENTOR.
GARTH CLOSE
BY
ATTORNEYS

July 22, 1969  G. CLOSE  3,456,763
LIFT UNLOADER GROCERY CART
Filed Jan. 10, 1967  11 Sheets-Sheet 10

INVENTOR.
GARTH CLOSE
BY
Woodhams, Blanchard & Flynn
ATTORNEYS

July 22, 1969  G. CLOSE  3,456,763
LIFT UNLOADER GROCERY CART
Filed Jan. 10, 1967  11 Sheets-Sheet 11
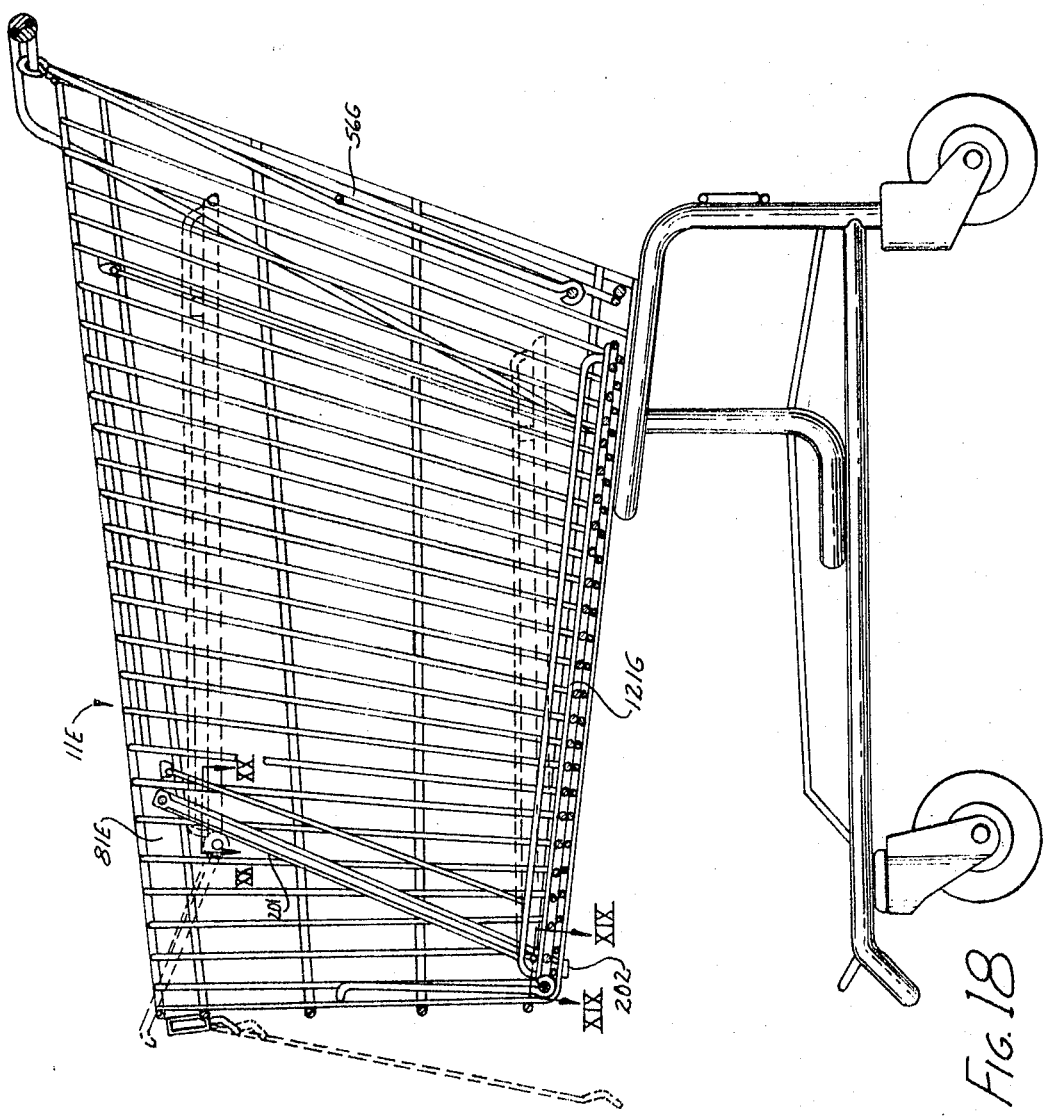
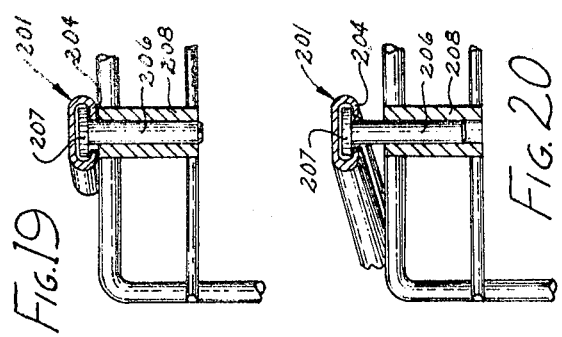
INVENTOR.
GARTH CLOSE
BY
Woodhams, Blanchard & Flynn
ATTORNEYS United States Patent Office 3,456,763
Patented July 22, 1969

3,456,763
LIFT UNLOADER GROCERY CART
Garth Close, Lubbock, Tex., assignor to United Steel & Wire Company, Battle Creek, Mich., a corporation of Michigan
Filed Jan. 10, 1967, Ser. No. 608,394
Int. Cl. A47f 9/02; B65g 67/08
U.S. Cl. 186—1         20 Claims

ABSTRACT OF THE DISCLOSURE

This invention relates to a shopping cart and associated apparatus to assist unloading of said cart. The shopping cart includes a basket having a liftable tray covering the bottom thereof. The tray may be raised as the basket is being unloaded to lift goods in the basket to the level of the checkout stand and the top of the basket wall. Elevating means are connected to the tray for raising same in the basket to render the goods supported thereon accessible for unloading.

---

This invention relates to shopping carts, and particularly to a shopping cart and means mounted independently thereof but cooperating therewith for assisting in the unloading of same. More particularly, the invention consists of a shopping cart having a liftable bottom, attachable and detachable from lifting means associated with separate mounting means, such as the check stand on the retail establishment in which the shopping cart is to be used, by which the bottom of the cart may be raised by power under the control of store personnel, such as the checker operating said check stand.

It has long been recognized in the operation of retail establishments of the supermarket type that an important factor of profitable operation is the easy and rapid flow of both customers and merchandise therethrough. Accordingly, great efforts have in the past been made to promote such ease and rapidity of flow. The equipment supplied for such retail establishments and, in fact, the design of such establishments themselves has been directed toward this end. However, a serious bottleneck has continued to exist at the checkout stands and this has been the source of frequent and often irritating delays for the customer. Accordingly, equipment which will tend to speed the flow of customers and merchandise past the check stands will be advantageous.

Therefore, among the objects of this invention are:

(1) To provide apparatus for use in retail establishments of the supermarket type which will tend to increase the speed and convenience of flow of both customers and merchandise therethrough.

(2) To provide apparatus, as aforesaid, which will tend to increase the rate of flow of customers and merchandise through the checkout portion of such establishments.

(3) To provide apparatus, as aforesaid, which will both assist and tend to urge the rapid unloading of shopping carts at the check stand portion of such retail establishments.

(4) To provide a shopping cart and means cooperating therewith at the checkout counter which will render easier, and tend to hasten, the unloading of such shopping carts.

(5) To provide apparatus including a shopping cart and means cooperable therewith mountable near or at a checkout counter by which the bottom of the shopping cart can be lifted in a controllable and predetermined manner in order that the merchandise in the shopping cart can be more readily reached by either the customer or the checker, or both, whereby to render easier the unloading of said shopping cart.

(6) To provide a shopping cart and auxiliary equipment cooperable therewith, as aforesaid, which may be controlled by the checker and used if desired to urge a more rapid unloading of the shopping cart than a customer might otherwise carry out.

(7) To provide apparatus, as aforesaid, in which said auxiliary equipment may be readily mounted on or in other association with a wide variety of types of check stands, including all types of check stands that are presently in common use.

(8) To provide a shopping cart and auxiliary equipment, as aforesaid, which may be readily adapted for use with a wide variety of designs of shopping carts including all, or practically all, shopping carts presently in common use.

(9) To provide apparatus, as aforesaid, which is of relatively simple construction so that it can be added to a shopping cart of otherwise substantially standard design at only a very minor cost and wherein further said auxiliary equipment may be mounted in association with a check stand of otherwise standard construction and likewise at only minor additional cost.

(10) To provide apparatus, as aforesaid, which will be of sufficiently simple design, both as to the shopping cart portion thereof and as to the portion used in association with a check stand, that its manner of operation will be obvious to the users thereof whereby even the most nonmechanical shopper can use same effectively, either without instructions or in pursuance of only the most simple verbal instructions which can be given by the checker at the checkout counter.

(11) To provide apparatus, as aforesaid, which can be applied either to shopping carts and checkout stands already in use or which can readily be incorporated into shopping carts and checkout stands during the process of manufacture thereof.

Other objects and purposes of the invention will become apparent to persons acquainted with apparatus of this general type upon reading of the following specification and inspecting the accompanying drawings.

In the drawings:

FIGURE 1 is a partially broken, side elevational view of a shopping cart and check stand construction associated therewith both according to the present invention.

FIGURE 2 is an enlarged, fragmentary, front elevational view substantially taken on the line II—II of FIGURE 1.

FIGURE 3 is an enlarged, partially broken side elevational view of the shopping cart of FIGURE 1.

FIGURE 4 is an enlarged fragment of FIGURE 3 showing the open position of the baby seat portion of the cart in broken lines.

FIGURE 5 is an enlarged fragment of FIGURE 3.

FIGURE 6 is an enlarged, partially broken fragment of FIGURE 2.

FIGURE 7 is a fragmentary sectional view taken on the line VII—VII of FIGURE 6 and further showing the hook member associated with the check stand.

FIGURE 8 is a sectional view taken on the line VIII—VIII of FIGURE 7.

FIGURE 18 is a partially broken side elevational view similar to FIGURE 3 and showing a modification.

FIGURE 19 is an enlarged section taken on the line XIX—XIX of FIGURE 18.

FIGURE 20 is an enlarged sectional view taken on the line XX—XX of FIGURE 18.

Figure 1A:
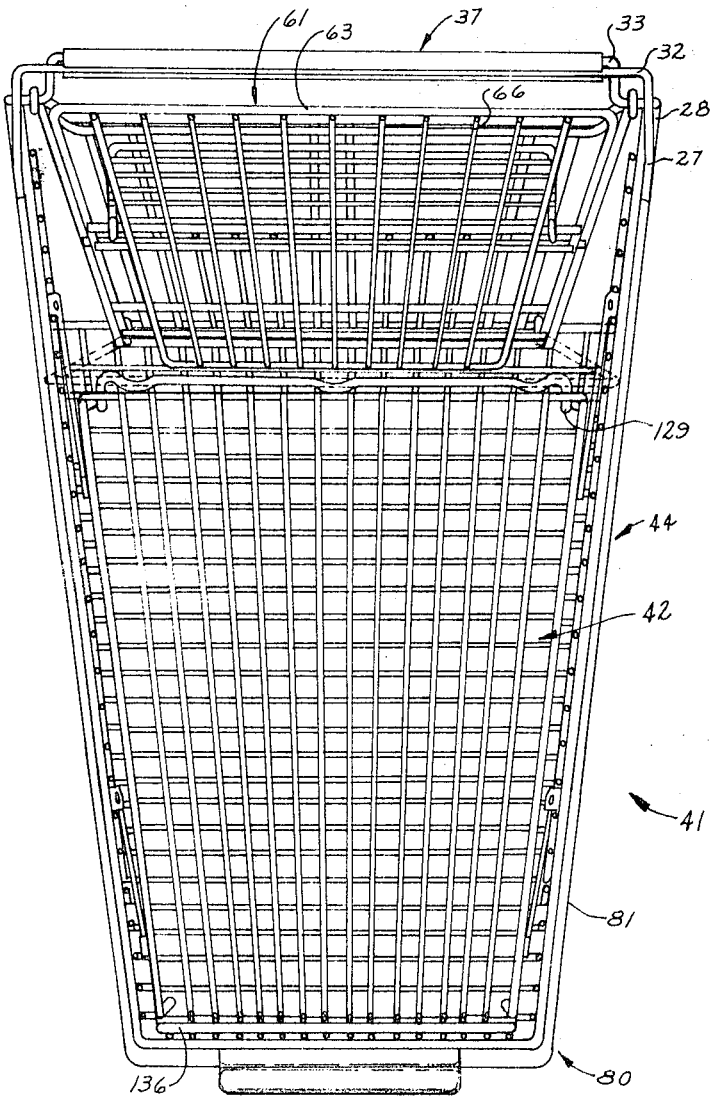
FIGURE 1A is an enlarged top view of the cart of FIGURE 1.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal direction of movement of the shopping cart embodying the invention and to the reverse direction, forwardly thereby being toward the left in FIGURE 1. The words "inwardly" and "outwardly" will refer to directions toward and away from, respectively, the geometric center of the device and designated parts thereof. Said terminology will further include the words above specifically mentioned, derivatives thereof and words of similar import.

General description

In general, the objects and purposes of this invention are met by providing a shopping cart construction and associated apparatus to assist unloading of said cart. More particularly, the shopping cart includes a basket having a liftable tray covering the bottom thereof. The tray may be raised as the basket is being unloaded to lift goods in the basket to the level of the checkout stand and the top of the basket wall. A cable duct extends along the upper edges of front and side walls of the basket. An upwardly turned finger is affixed to the cable and extends forwardly from the front wall of the cart. The finger is engageable by a downwardly opening hook supported for reciprocation on a vertical track on the check stand. Suitable energizing means are provided in the check stand for moving the hook downwardly into engagement with the cart-supported finger when the cart is in a predetermined position with respect to the check stand. The hook pulls the finger and the attached cables downwardly to raise the tray from the bottom of the basket. The energizing means is reversible to allow gravity to return the tray to the bottom of the basket and to thereafter release the cart finger to allow the cart to be stored or to be further used.

Detailed description

FIGURES 1, 2 and 3 disclose apparatus 10 showing one construction of a cart embodying the invention. The apparatus 10 includes a grocery cart 11 which in this construction has a tubular frame generally indicated at 12. The frame 12 includes a generally U-shaped tubular bottom member 13. The bottom member 13 is generally horizontal and supports an upstanding member 14 at each rear corner thereof. The upstanding members 14 are angled forwardly at points spaced above the member 13 and are gently sloped upwardly as indicated at 15. An integral cross conduit 16 (FIGURE 3) joins the forward ends of the upstanding members 14 and overlies the intermediate portion of the bottom member 13.

The upper ends of upstanding L-shaped brackets 17 and 18 fixedly contact the forwardly extending portions 15 of the upstanding members 14 behind the cross conduit 16. The lower, horizontal legs of the L-shaped brackets 17 and 18 extend forwardly along and are fixed to the side portions of the bottom frame member 13. Suitable transverse bracing 19 connects the upstanding members 14. The frame 12 is supported on casters 20 and 21 disposed beneath the rear, and beneath and adjacent the forward end of the bottom frame member 13. The rearward casters 20 are preferably fixedly aligned with respect to the frame 12. A package shelf 22 is supported on the frame 12 adjacent and above the perimeter member 13, the shelf 22 sloping somewhat upwardly toward the rear thereof and being mounted by any convenient means, not shown, to the perimeter frame in a conventional manner to allow nesting of the shopping cart 11 with other similar carts.

The cart 11 includes a handle support 26, which in this embodiment includes a pair of upstanding and rearwardly canted rod members 27 and 28 disposed on each side of the frame 12 and affixed intermediate the ends of the sloped portions 15 of the upstanding members 14. The rod members 27 and 28 converge upwardly. The forward rod member 27 is bent sharply rearwardly at a point well spaced above the frame 12 and extends a short distance past the rear rod member 28. The rear rod member 28 is bent sharply inwardly at 30 (FIGURE 4) for a short distance below the rearwardly extending portion 29 of the forward rod member 27 and then extends rearwardly a short distance as indicated at 31 (FIGURES 1, 3 and 4). The front and rear rod members 27 and 28 on one side of the frame are joined to the corresponding rod members on the other side of the frame by integral crosspieces 32 and 33 which extend in parallel, close-spaced relationship and are joined by suitable half shells 34 and 36 to form a manually engageable handle 37 for the cart 11.

The cart 11 is provided with a rigid basket 41 (FIGURES 1 through 4) of mesh construction having an open top and rearward end and closed bottom, front and sides. In the particular embodiment shown, the front wall 43 and side walls 44 of the basket 41 are vertical, the bottom being sloped as are the sloped portions 15 of the upstanding members 14 of the frame. The top edges of the sides of the basket are sloped upwardly toward the rear thereof and the rear edges of the basket sides are canted rearwardly toward the upper ends thereof. The side walls 44 of the cart preferably converge forwardly at a shallow angle the convergence of the side walls and the tapered shape thereof facilitate nesting of a series of such carts in a conventional manner by reception of the basket 41 thereof partially with the basket of another disposed forwardly thereof.

The basket 41 is formed of a series of rods welded together. Referring particularly to FIGURES 2 and 3, the bottom wall 42 comprises a spaced plurality of longitudinally extending rods 48 which extend from the rear end of the basket forwardly to the bottom of the forward wall 43 and are bent upwardly to define said forward wall. The bottom wall 42 is completed by a plurality of longitudinally spaced, transversely extending rods 49 which are bent upwardly at the outer edges of the bottom wall and extend upwardly therefrom to define the side walls 44 of the basket 41. The basket is completed by a plurality of vertically spaced and substantially horizontally disposed rods 51 bent in a U-shape, the bights of which extend across the front wall 43 outside the upstanding portions of the longitudinal rods 48 and the legs of which extend along the side walls 44 outside the upstanding portions of the transverse rods 49. The sections of the rods 48, 49 and 51 are all preferably welded in a conventional manner to form a rigid basket structure.

The horizontal rods 51 are secured adjacent their rear ends to and extend past the inner sides of the handle-forming rods 27 and 28. A transverse perimeter rod 52 extends across the rear end of the bottom wall 42 at and in front of the rear handle rod 28 to define the rearward end of such bottom wall.

The rearward end of the basket 41 is closed by a gate 56 (FIGURE 4) pivotally mounted above the basket 41 and arranged in its depending position shown in FIGURES 1 through 4 to close the otherwise open rearward end of the basket. The gate 56 pivots upwardly and forwardly in a conventional manner to allow the front end of a further cart basket, not shown, to be placed in telescopic relationship within the basket 41 for nesting. More particularly, the gate 56 comprises, in the particular embodiment shown, a plurality of transversely spaced, generally upstanding rods 57 connected by a plurality of transverse rods 58 spaced along the inner sides of the upstanding rods 57. The upper ends of the outermost upstanding rods 57 are curled forwardly about the inward extensions 30 of the rearward handle-supporting members 28 as indicated at 59, such curled portions 59 providing the pivotal mounting of the gate 56 on the cart. In its normal closed position shown, the bottom end of the gate 56 rests against the perimeter rod 52 defining the rear edge of the cart bottom wall 42, thereby preventing rearward movement of the gate out of the rearward end of the basket.

In the particular embodiment shown, the gate 56 supports a collapsible baby seat generally indicated at 61, the baby seat being shown in collapsed position in FIGURES 1, 2 and 4 and, in broken lines, in its open position of use in FIGURE 4. The baby seat construction 61 generally includes a backrest portion 62 comprising a generally U-shaped downwardly opening rod 63, the plane of which generally parallels that of the gate 56 and is set slightly forwardly therefrom. The lower ends of the rod 63 are rearwardly curled around one of the lower transverse rods 58 of the gate 56 for rearward pivotal movement with respect thereto. Transverse rods 64 extend across the backrest 62 between the upstanding legs of the rod 63 and are fixed to the rearward face thereof. A plurality of upstanding rods 66 are fixed to the upper bight portion of the U-shaped rod 63, to the intermediate rods 64 and to a further transverse rod 65 disposed near the lower end of the legs of the rod 63. The outer ones of the rods 66 are joined at their lower ends by an integral transverse portion 60.

The seat portion 67 of the baby seat 61 includes a gen-U-shaped rod 68, the ends of which are curled upwardly around the upper one of the intermediate rods 64 on the backrest 62. The forward or bight portion of the U-shaped rod 68 rests against one of the upstanding rods 57 defining the gate 56 and is raised above the rod 64 upon which it is pivoted. Thus, upon closure of the backrest 62 from its dotted line position to its solid line position, the rearward bight portion of the seat defining U-shaped rods 68 slides upwardly upon the ones of the upstanding rods 57 supporting same to its essentially upstanding position shown in solid lines in FIGURE 4. Suitable support rods 69 extend transversely across the legs of the U-shaped rod 68. A seat plate 71 formed of sheet plastic or the like has a curled forward or lower end 72 which is pivotally wound in a clockwise direction around a transverse rod 70 fixed on the gate 56. The plate 71 is thus disposed between the gate and the U-shaped seat defining portion 68 when the baby seat is in its closed, solid line condition and is pivotable in a counterclockwise direction downwardly and rearwardly upon the upwardly facing support rods 69 when the baby seat is in its broken line position for supporting a baby thereupon.

The particular cart 11 here shown has been described in detail above to illustrate one preferred embodiment for the present invention, but the present invention, at least in its broader aspects, is no limited to the particular detailed construction of the cart 11 above given.

The basket 41 is provided with a supporting and lifting mechanism generally indicated at 80 to which the present invention, at least in its narrow aspects, is more particularly directed. The supporting and lifting mechanism 80 (FIGURES 1A and 3) includes a generally U-shaped cable duct 81 which is fixed to and extends across the front wall 43 of the cart basket 41 and rearwardly along the side walls 44 thereof. In the particular embodiment shown, the cable duct 81 ends just ahead of the forward rods 27 of the handle support 26. The cable duct 81 is preferably located on the exterior surface of the front and side walls and at the upper edges thereof. In this particular embodiment, the cable duct 81 is snugly disposed between the uppermost pair of horizontal basket rods 51. The cable duct 81 is of hollow rectangular cross section and in the preferred embodiment shown is formed by opposed pair of channels 82 and 83 (FIGURES 6–9), the exterior channel 82 being wider than the inner channel 83 and receiving same in snugly telescoped relationship therewithin. The exterior channel 82 is of one piece and follows the generally U-shaped path above described around the rim of the basket. On the other hand, the interior channel 83 is in three segments, one being disposed along the front wall of the basket and the other two along the side walls thereof. The channels 82 and 83 are held together by any convenient means, such as welding, and the cable duct 81 as a whole is affixed to the basket in a manner hereinafter described.

A cover member 86 (FIGURE 1, 2 and 7) extends forwardly and depends from the central portion of the cable duct 81. As viewed in front, the cover member 86 is essentially rectangular in form. When viewed from the side, the front wall of the cover member 86 comprises upper and lower outwardly convergent planes 87 and 88 extending from upper and lower surfaces 89 and 91. The lower surface 91 is provided with a depending flange 92. The cover member 86 has end walls 93 including generally rectangular cutouts 94 adjacent the rear edges thereof extending downwardly from the upper surface 89. Thus, the cover member 86 fits over the cable duct 81, the upper surface 89 of the cover member resting on the upper surface of the cable duct 81, said cable duct 81 extending laterally outwardly through the cutouts 94 in snug relation thereto. The depending flanges 92 rest against the upstanding portions of the longitudinal rods 48 of the basket and are secured thereto by bolts 96 extending through the flanges 92. The bolts extend past such upstanding rods 48 and threadedly engage retaining plates 97, which overlap the rods 48 inside the basket 41. In cooperation with the horizontal rods 51 between which the duct is located, the cover member 86 assists in rigidly fixing the cable duct 81 to the basket.

The central portions of the surfaces 88 and 91 and flange 92 of the cover member 86 are cut away to define a downwardly opening notch 98. Essentially coextensive central openings 99 and 100 are provided in the lower flanges of the channels 82 and 83 of the cable duct 81 above the notch 98.

A pair of rotatable cable guides 102 and 103 (FIGURES 6–9) are rotatably supported upon pins 104 extending between and fixed to the webs of the channels 82 and 83. The cable guides 102 and 103 are preferably located midway between the upper and lower flanges of the inner channel 83 and extend inwardly of the edges of the notch 98.

Pins 106 (FIGURE 9) extend between the webs of the channels 82 and 83 and are located intermediate the flange portions of the interior channel 83. Corner reinforcing plates 107 are fixed to and extend toward the interior of the basket from the upper and lower flanges of the exterior channel 82 at the corners thereof. The plates 107 at each corner are parallel and carry a vertical pin 108 extending therebetween upon which is rotatably mounted a roller 109. The periphery of the roller 109 extends into the cable duct beyond and between the ends of the webs of the interior channels 83.

Pulley wheels 111 and 112 (FIGURES 5 and 9) are mounted on the portions of the cable duct 81 extending along the sides of the basket. The forward pulleys 111 are spaced rearwardly from the front wall 43 of the basket and the rearward pulleys 112 are spaced, here by a lesser distance, forwardly of the gate 56. The space between the forward and rearward pulleys 111 and 112 on each side of the basket is substantially greater than their spacing from the adjacent front wall and gate. The pulleys 111 and 112 are mounted in a similar manner with respect to the cable duct 81, and a description of mounting of the forward pulley 111 will suffice for both. The bottom flange of the exterior channels 82 is removed as indicated at 114 at the location of the pulley wheel 111. In addition, relatively narrow vertical slots 116 extend upwardly from the opening 114 along the web of the interior channel 83 terminating adjacent the upper end thereof. Said slots 116 are provided on both sides of the pulley wheel 111. The portion of the web between the slots 116 is bent upwardly and inwardly at a shallow angle to the vertical to form a mounting flap 117. The interior side of the flap 117 carries a pin 118 on which the pulley wheel is rotatably fixed. The lower, rearward corner of the flap 117 is preferably cut away as indicated at 119. The cut-away portion 119 exposes the rearward end lower quadrant of the pulley wheel 111.

A tray 121 (FIGURES 3, 4 and 5), is removably disposed within the basket 41. The tray 121 comprises a perimeter rod 122 shaped to conform to the shape of the basket, here an isosceles trapezoid. The tray rests upon the transverse rods 49 of the bottom basket wall 42 and extends to the front and side walls of the basket as well as to the gate 56.

Figure 4A:
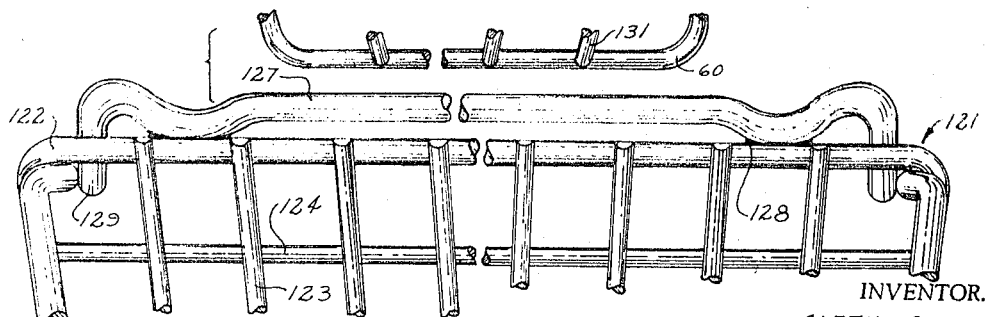
FIGURE 4A is an enlarged fragment of FIGURE 1A.
Figure 9:
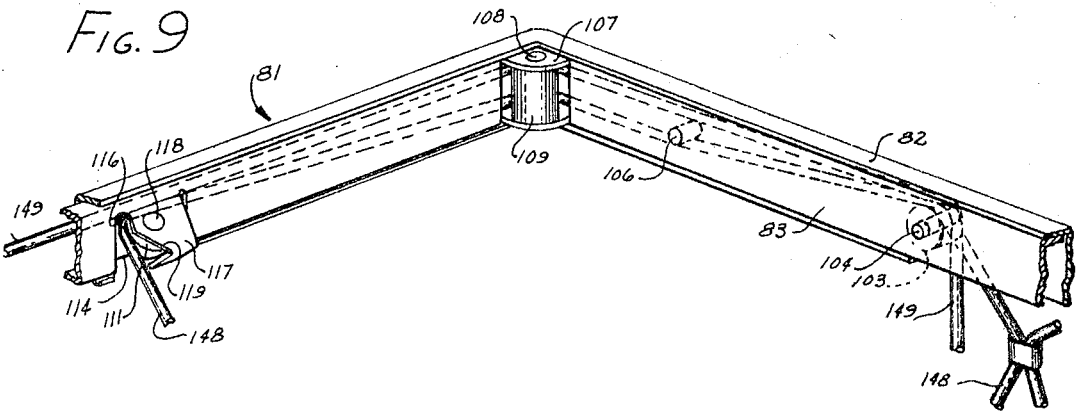
FIGURE 9 is a fragmentary oblique view of the cable duct of the cart of FIGURE 1.

As seen in FIGURES 4 and 4A, the tray 121 includes a mesh of longitudinal rods 123 and transverse rods 124 which are affixed to the perimeter rod 122. A retaining rail 126 extends along and above each side portion of the perimeter rod 121 and is affixed thereto. The retaining rails 126 and side portions of the perimeter rod determine by interference with the side wall of the basket the transverse position of the tray 121 therewithin.

A positioning rod 127 (FIGURES 1A, 4 and 4A) extends in closely spaced relationship along the rear side of the perimeter rod 122 and is bent inwardly into welded contact therewith at spaced locations 128 therealong. The ends 129 of the positioning rod 127 extend rearwardly and then downwardly, such ends sloping downwardly and forwardly between the outermost pairs of longitudinal rods 48 of the bottom basket wall 42 on either side of the baby seat construction 61. The midportion of the positioning rod 127 is adapted to slide downwardly along the fronts of the rods 66 of the baby seat construction 61 as the tray 121 is lowered in the basket. The lower ends 131 of the rods 66 are angled forwardly and disposed above the rearwardmost one of the transverse rods 49 of the bottom basket wall 42. As the tray 121 moves downwardly along the rods 66 and the midportion of the positioning rod 127 leaves the bottom ends 131 of the rods 66, the sloped ends 129 of the positioning rod enage the rearward one of the transverse rods 49 thereby moving the tray 121 forwardly as it settles to the bottom basket wall 42.

A generally rectangular flap 136 (FIGURES 2, 3 and 5) is pivotally affixed to the forward edge of the tray 121. When the tray 121 is in its lowered position shown, the flap 136 extends upwardly therefrom along the front wall 43 of the basket 41. The flap 136 is bounded by a perimeter rod 147. A plurality of rods 138 extend vertically between the upper and lower reaches of the perimeter rod 137 and are fixed to the rear faces thereof. A cross rod 139 extends transversely between the end reaches of the perimeter rod 137 and is located intermediate the upper and lower reaches thereof. The lower reach 141 of the perimeter rod 137 is disposed above and adjacent the front reach 143 of the perimeter rod 122 defining the tray 121. A plurality, here two, of hinge loops 142 surround the lower reach 141 of the flap and front reach 143 of the tray, the hinge loops 142 here being fixed to the flap reach 141 and pivotable on the tray reach 143. The end reaches of the tray perimeter loop 137 are disposed immediately in front of the forward ends of the retaining rails 126 of the tray to prevent clockwise pivotal motion of the flap 136 from its upstanding position in FIGURE 3 and 5.

Each side of the tray 121 is provided with a pair of cable anchors 146 (FIGURES 3 and 5). The cable anchors 146 extend between and are preferably welded to the side reaches of the tray perimeter rod 122 and the retaining rails 126 disposed immediately thereabove. The anchors 146 are spaced from the front and rear ends of the tray and are located forwardly of the pulley wheels 111 and 112, respectively. The cable anchors 146 are each provided with an upset tab 147, the tabs and remainder of the cable anchor being adapted to grip a cable, rope or the like therebetween. The spacing of the cable anchors 146 on each side of the tray 121 corresponds to that of the pulley wheels 111 and 112 located thereabove.

The supporting and lifting mechanism 80 further includes a pair of cables 150 (FIGURES 6, 7 and 8) disposed on opposite sides of the basket 41. Each cable 150 has a front reach 148 and a rear reach 149. The free ends of the front and rear reaches 148 and 149 of each cable 150 are secured to the corresponding front and rear cable anchors 146 on each side of the tray 121 for lifting the tray. Each front reach 148 extends upwardly over the rearward face of the front pulley wheel 111 and then extends forwardly into the cable duct 81. Each rearward reach 149 similarly extends upwardly around the rear face of the rear pulley wheel 112 and forwardly into the cable duct 81. The portions of the cable reaches 148 and 149 between the anchors 146 and duct 81 are rearwardly sloped as they extend upwardly and preferably parallel the closed gate 56. The cut-away portions 119 on the pulley-supporting flaps 117 allow the free passage of the corresponding cable reaches into the cable duct 81. The reaches 148 and 149 of each cable 150 turn at right angles about the corresponding roller 109 and extend along the central portion of the cable duct 81 on opposite sides of the pins 106 to pass over the corresponding one of the cable drums 102 and 103. The rearward reaches 149 of the cables 150 extend downwardly from the cable drums 102 and 103 and are affixed, as hereinafter described, to a depending finger member 151 (FIGURES 6 through 8). The forward reaches 148 extend toward each from the cable drums 102 and 103 and are secured firmly together by a clip 152. The forward reaches 148 extend downwardly from the clip 152 to the finger member 151. A little slack is provided in said forward reaches 148 for purposes appearing below. The finger member 151 is preferably formed of rigid sheet material such as steel and includes an upper portion 157, a depending and forwardly angled midportion 158 and an upturned and forwardly sloped end portion 159.

A backing plate 153 is fixed to the rearward face of the upper portion 157 by a pair of screws 154 which threadedly engage suitable upset portions 156 in the backing plate. The forward and rearward reaches 148 and 149 of each cable 150 pass downwardly between the finger member 151 and backing plate 153 on opposite sides of a corresponding one of the screws 154 and are integrally joined. Tightening of the screws 154 causes the cable to be tightly gripped between the upper portion 157 of the finger member 151 and the backing plate 153. The upper edges of the finger member 151 and backing plate 153 are preferably smoothly curved away from the cables 150 to avoid kinking or undue wear thereof. The finger member 151 is removably receivable in the notch 98 in the cover member 86.

The tray 121 may be raised from the bottom wall 43 of the basket 41 by pulling the finger member 151 away from the nose member 86. It will be noted that downward movement of the the finger member 151 through a given distance causes a subsequent longitudinal movement of the forward cable reaches 148 through a similar distance whereas the rearward cable reaches 149 undergo a lesser longitudinal displacement. More particularly, the portions of the forward reaches 148 between the clip 152 and cable drums 102 and 103 are angularly displaced downwardly from their horizontal positions shown in FIGURES 6 and 8 through a downwardly angled position shown in broken lines in FIGURE 2 at 148B as the finger 151 is moved downwardly from the cover member 86 whereas the rear reaches 149 undergo only longitudinal displacement.

As a result of their angular displacement, less longitudinal displacement is required of the front reaches 148, particularly during the initial part of the downward movement of the finger member 151.

The initial upward displacement of the rearward end of the tray 121 will exceed that of the forward end of the tray as a result of the differing displacements of the front and rear cable reaches, and the slack in the front reaches so that the initially sloped tray 121 approaches a relatively level orientation as shown in broken lines at 121A in FIGURE 3. As the tray 121 is raised, the rearwardly and upwardly sloping cables 148 and 149 pull the tray rearwardly and cause the positioning rod 127 thereof to ride upwardly along the rods 66 of the baby seat construction 61. In fact, the tray is arranged to close the empty baby seat construction 61 as it moves upwardly. As the tray 121 rises toward its uppermost broken line position 121B, the rate of rise of the rearward end of the tray diminishes and approaches that of the forward end of the tray as a result of diminishing angular movement of the rearward reaches 149. Thus, the tray in its uppermost position 121B will be essentially level.

Further, as the tray rises, the forward end thereof is displaced rearwardly from the front wall 43 of the basket. The upper end of the flap 136 tends to follow the inner surface of the wall 43 upwardly, the flap pivoting forwardly as the tray rises. The flap 136 thus extends forwardly as indicated at 136B in broken lines in FIGURE 3, from the tray when the tray is in its uppermost position and bridges the space between the forward end of the tray and the top of the front basket wall 43.

Figure 11:
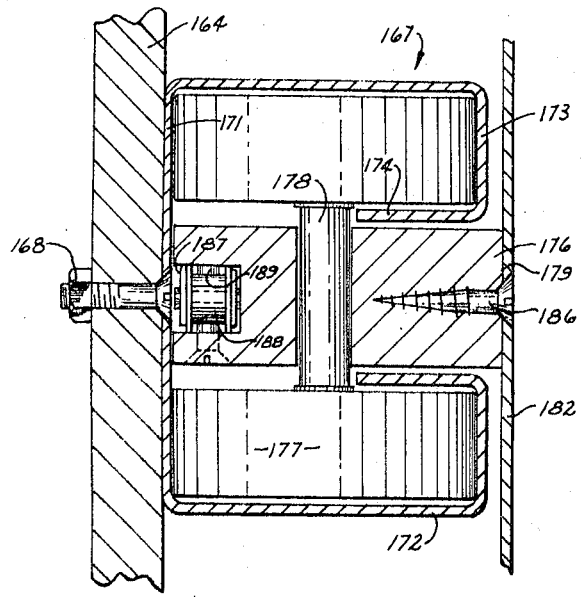
FIGURE 11 is an enlarged fragmentary sectional view taken on the line XI—XI of FIGURE 1.

The apparatus 10 embodying the invention further includes a lift mechanism 161 (FIGURE 1) adapted to be supported upon a check stand 162 of any conventional type. In the particular embodiment shown, the lift mechanism 161 is disposed at one end of the check stand against which the shopping cart 11 is adapted to be pushed. A tubular bumper 163 extends transversely across the wall 164 of the check stand beneath the countertop 166 for abutting the cover member 86 on the cart 11 to position the cart longitudinally of the counter properly with respect to the lift mechanism 161. The lift mechanism 161 includes a closed housing 161 having in its outer faces a slot associated with an upstanding guideway 167, said housing 161 being affixed to the wall 164 by any convenient means, here by bolting as indicated at 168. The guideway 167 (FIGURE 11) is generally U-shaped in cross section, having a web 171 which lies against the wall 164 and spaced parallel side walls 172 extending from the web 171. Flanges 173 extend inwardly from the side walls 172 toward and are spaced from each other. Extensions 174 of the flanges 173 are bent toward the web wall 171. A traveler block 176 is slideably disposed within the member 167 between the extensions 174 and close to the web 171. The traveler block 176 is soupported for vertical reciprocation along the member 167 by a pair of rollers 177 disposed on opposite sides thereof. The rollers are rotatably disposed with respect to the block and are carried by a shaft 178 extending through the traveler block. The rollers are axially bounded by the extensions 174 and side walls 172 and roll along the flanges 173 and web 171.

Figure 11A:
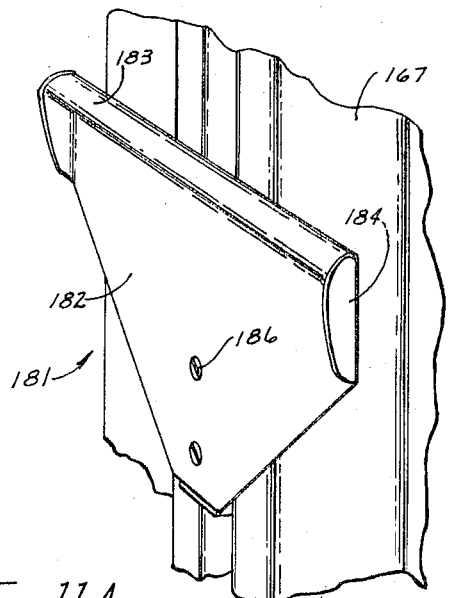
FIGURE 11A is a fragmentary, oblique view of the hook member associated with the check stand.

The traveler block 176 supports on its outer face 179 a hook 181 engageable with the finger member 151 of the cart. The hook 181 (FIGURES 11 and 11A) comprises a generally triangular plate 182 having a horizontal upper edge which is curled outwardly and downwardly as indicated at 183 for engaging the end portion 159 of the finger 151 and pulling same downwardly. The width of the upper hooked edge 183 exceeds that of the finger 151 and approximates that of the cover member 86. Flanges 184 on the upper corners of the plate 182 are bent at right angles to the plate 182 and are fixed, as by welding to the curved upper edge 183 for reinforcing same. The plate 182 is attached by screws 186 to the traveler block 176.

A vertical groove 187 (FIGURE 11) is centered in the face of the traveler block 176 opposed to the check stand. An endless roller chain 188 extends vertically through the groove and is affixed to the block by a screw 189. The chain 188 (FIGURE 1) extends longitudinally of the guideway 167 within the housing and is supported on rotatable sprockets 191 and 192, which are in turn rotatably supported adjacent the upper and lower ends of the check stand at the wall 164.

Figure 10:
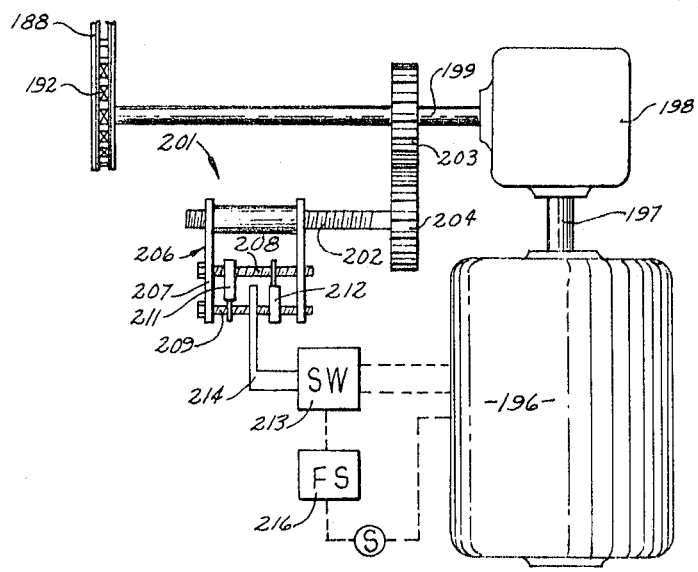
FIGURE 10 is an enlarged fragment of the drive mechanism of the check stand of FIGURE 1.

The check stand houses an electric motor 196 (FIGURE 10), the output shaft 197 of which drives a speed reduction gearbox 198. The output shaft 199 of the gearbox 198 fixedly mounts a sprocket 192 driveably engaging the chain 188 for raising and lowering the hook 181. A limiting mechanism 201 disposed adjacent the motor comprises a threaded shaft 202 rotatably supported by any convenient means, not shown, and positively driven from the gearbox output shaft 199 through gears 203 and 204. A switch actuator 206 is threadedly supported on the shaft 202 and is constrained by any convenient means, not shown, to axial movement therealong in response to rotation of the threaded shaft. The actuator 206 includes a parallel pair of radially extending arms 207 between which are fixed two threaded rods 208 and 209 paralleling the threaded shaft 202. The rods 208 and 209 threadedly support corresponding levers 211 and 212, respectively. The free ends of the levers 211 and 212 rest upon the other one of the rods 208 and 209. A switch 213, connected in circuit with the motor 196 and a source S of electrical power has an actuator arm 214 disposed for actuation by and between the levers 211 and 212. In addition, a manually operated switching device, here a foot switch 216, is connected in any conventional manner in circuit with the source S, limit switch 213 and motor 196 for energizing the motor 196 to raise and lower the hook 181. The energized motor shifts the actuator 206 along the shaft 202 moving one of the levers 211 and 212 into contact with the actuator arm 214 of the limit switch 213 as the hook reaches the desired limit of travel. When contacted by one of the levers, the actuator 214 causing the limit switch 213 to reverse the motor and, thus, the hook travel. Release of the foot switch 216 shuts off the motor 196 stopping the hook 181. Rotation of the threaded rods 208 and 209 adjusts the positions of the levers 211 and 212 on the actuator 206 and, thus, the corresponding limiting positions of the hook 181 on the guideway 167.

Operation

The supporting mechanism 80 may be applied both to new and to existing shopping carts of a wide variety of designs. To install the cable duct 81, with the cables 150 and finger 151, the cart 11, the side portions of the cable duct 81 are urged rearwardly along the side walls 44 of the cart basket between the two uppermost rods 151 thereof until the front reach of the cable duct abuts the front wall of the cart. The side reaches of the cable duct preferably are resiliently spread somewhat to avoid interference between the upstanding rods 49 of the basket and the inwardly angled flaps 117 on the cable duct. When in position, the legs of the cable duct 81 are allowed to spring resiliently inwardly whereby the flaps 117 enter between adjacent ones of the transverse rods 49 of the basket. The forward edges of the flaps snugly contact the adjacent basket rods, thereby preventing forward movement of the cable duct 81 with respect to the basket. Thereafter, the cover member 86 may be bolted to the cart basket in front of the cable duct 81 to complete the securing of the cable duct 81 rigidly to the basket.

Thereafter, the ends of the cables 150 may be attached to the anchor plates 146 by the tabs 147. The tray 121 and flap 136 hingedly attached thereto may then be deposited in the bottom of the basket.

The lifting mechanism 161 is also readily installable either on new check stands during manufacture or on existing check stands. More particularly, the drive mechanism including the motor 196 is mounted within the check stand and the bumper 163 and guideway 167 are secured to the wall 164 of the check stand 162 against which the cart is to be run, openings being provided in such wall for the chain 188.

In use, the tray 121 rests on the bottom wall 42 of the basket with the flap upstanding therefrom adjacent the front wall of the basket. The finger 151 extends below the cover member 86 and has its upper end 157 housed therewithin. In this condition, the baby seat construction 61 may be either in its open position shown in dotted lines in FIGURE 4 or in its closed position shown in solid lines. The basket may now be filled with merchandise, which is placed on the tray 121. The cart may then be pushed to the check stand 162. The cart is pushed forwardly toward the wall 164 and is stopped when the upper face 87 of the cover member 86 contacts the bumper 163. The finger 151 is preferably at least approximately centered below the hook 181 which is normally in its raised position of FIGURE 1. The hook 181 is sufficiently wider than the finger 151 that precise centering is not required. Actuation of the foot switch 216 (FIGURE 10) energizes the motor 196 to draw the hook 181 downwardly into engagement with the finger 151. The finger 151 is drawn downwardly by the hook and in turn draws the cables 150 downwardly for raising the tray 121.

As described above, the slack connection of the front reaches 148 of the cables 150 by the clip 152 causes the initial downward motion of the forward cable reaches 148 to be slower than that of the rearward cable reaches 149, thereby resulting in an initial pivotal movement of the tray 121 from its sloped solid line position of FIGURE 3 to its substantially level broken line position 121A. As the finger 151 continues downwardly, the rate of rise of the front end of the tray approaches that of the rear end, the tray rising generally in a level manner thereafter to its level uppermost position indicated at 121B in broken lines in FIGURE 3.

The foot switch is preferably released as the tray approaches its uppermost limit for stopping the motor and thus the downward progress of the hook 181 and finger 151. The tray may be raised in steps if desired by occasionally releasing the foot switch. The internal friction of the drive and back torque of the energized motor multiplied by the reduction gear box 198 hold the tray elevated even when loaded with merchandise. Thus, the customer or checker may be given as much time as may be needed to unload the cart by occasionally stopping the rise of the tray 121.

The speed reduction of the gear box 198 is preferably set so that the tray will rise at a rate will allow the average shopper to unload the tray at an efficient speed for checking. The goods in the basket are raised substantially to the level of the countertop 166 by the tray thus minimizing lifting as the goods are shifted from basket to counter. The tray 121 and flap 136 are arranged with the longitudinal rods thereof uppermost so that goods may be readily slid therealong. Thus, mechandise may be removed from the cart by sliding same forwardly along the tray and flap onto the countertop without any lifting at all.

After unloading of the cart has been completed, the foot switch 216 (FIGURE 10) may be actuated to energize the motor 196. If the tray had not reached its uppermost limit before stopping for unloading, it will now rise to such limit. The levers 211 and 212 are adjusted on the threaded rods 208 and 209 so that as the tray reaches its uppermost position indicated at 121B (FIGURE 3), one of the levers 211 and 212 will strike the actuator arm 214 of the limit switch 213 causing the motor 196 to shut off. A separate push button switch is there activated to reverse the motor. The reversed motor raises the hook 181, allowing the finger 151 to be drawn upwardly by the cables 150 in response to the weight of the tray 121 and flap 136. Release of the foot switch stops the rise of the hook as it reaches its upper limit. If desired the switches 213 and 216 may be arranged to shut off the motor automatically as limits of tray travel are reached. In the particular embodiment shown, the rising tray 121 causes the unoccupied baby seat to close. If the baby seat is occupied, the tray 121 stops early in its rise due to the convergence of the front basket and baby seat walls. The baby seat construction will not close when occupied due to the weight of the child on the seat plate 71. More particularly, the supporting U-shaped rod 68 cannot pivot upwardly to collapse the baby seat unless the seat plate will pivot freely upwardly.

With the baby seat closed, it will be noted that as the tray rises, the lateral space available to the merchandise increases and there is thus no tendency for the basket walls to pack or laterally press against the merchandise as it is raised.

As the hook 181 approaches its uppermost limiting position, the tray 121 settles on the basket bottom and the finger 151 stops rising. The hook 181 rises sufficiently to release the finger allowing the cart to be moved away from the check stand for further use. The foot switch may then be released to stop the hook in its uppermost position.

Modification

Figure 12:
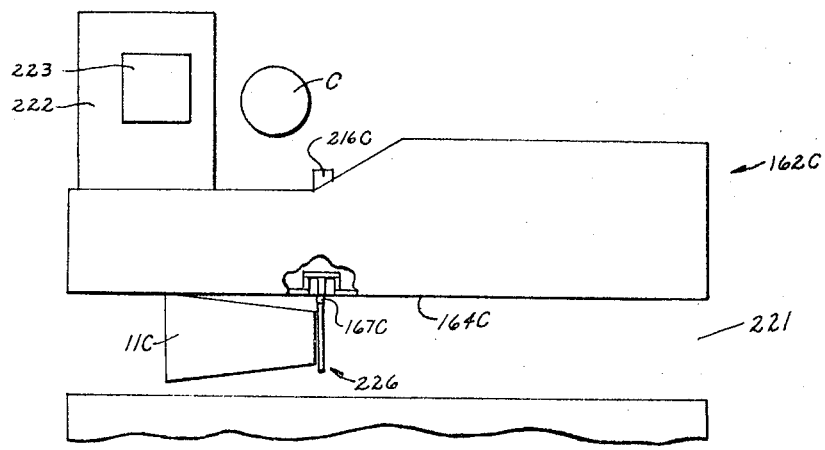
FIGURE 12 is a diagrammatic, top elevational view of a modified check stand arrangement for use with a shopping cart of the type embodying the invention.

FIGURE 12 diagrammatically illustrates a modified check stand 162C of a type commonly found in supermarkets and the like. An aisle 221 is provided beside the check stand 162C along which the shopping cart 11C is to be moved. The checker C stands on the opposite side of the check stand from the shopping cart 11C, the foot switch 216C being place dfor convenient actuation by the checker C. A sideward extension 222 of the check stand 162C supports a cash register 223 in a conventional manner for use by the checker C. The check stand 162C is adapted to house the lift mechanism 161 above described with respect to FIGURES 1 through 11. The guideway 167C is affixed to the longitudinal wall 164C of the check stand at a point opposite the checker C.

Figure 14:
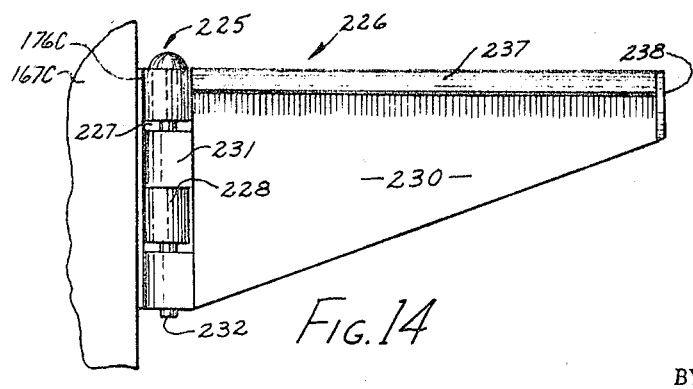
FIGURE 14 is a side elevational view of a hinged corner-mounted hook associated with the check stands of FIGURES 12 and 13.
Figure 15:
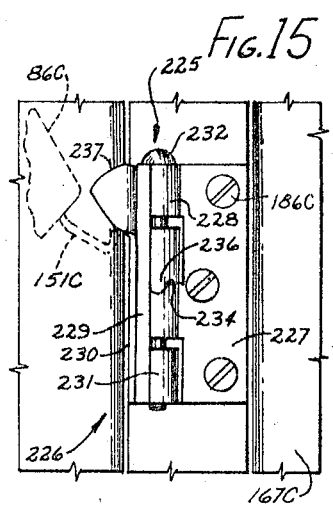
FIGURE 15 is a rightward end elevational view of the corner-mounted hook of FIGURE 14.

The guideway 167C supports a modified hook construction 226 illustrated in detail in FIGURES 14 and 15. The hook construction 226 includes a hinge 225 comprising a hinge plate 227 affixed by screws 186C to the traveler block 176C. The hinge plate 227 has spaced, coaxially curled portions 228. The hinge 225 includes a further hinge plate 229 having curled portions 231 along one edge coaxially aligned and interfingered with the extensions 229 and pivotally connected therewith by a vertical hinge pin 232. A triangular plate 230 is fixed to one face of the swinging hinge plate 229 and extends horizontally therebeyond. One curled portion 228 lies below and axially supports one of the portions 231, the upper edge of the portion 228 being recessed at 234 to receive a protruding cam portion 236 in the lower edge of the portion 231. The recessed edge 234 and cam edge 236 interengage to maintain the triangular plate 230 perpendicular to the check stand wall 164C in response to the weight of the plate 229. Space is provided between the adjacent edges of the other portions 231 and 228 to allow limited upward movement of the triangular plate 230. The relieved edge 234 and protruding cam edge 236 are smoothly curved to allow the cam 236 to slide out of the recess and thereby permit the triangular plate to be pivoted on the hinge pin 232 to a position parallel to the wall 164C. The upper edge portion 237 of the triangular plate 230 is hooked downwardly and toward the cart 11C in essentially the same manner as the upper edge 183 of the hook 181 above described. A reinforcing flange 238 is provided at the outer end of the plate 229 to stiffen the hooked edge 237. In its upward limiting position, the hooked upper edge of the hook construction 226 is horizontally opposed to the cover member indicated in broken lines at 86C in FIGURE 15. The finger 151C is disposed below the hook 237. The cart 11C is rolled forwardly and to the right along the aisle 221 until the cover member 86C contacts the hook 237. The cart is then stopped and the foot pedal actuated by the checker to move the block 176C downwardly along the guideway 167C into contact with the upturned portion of the finger 151C. The finger 151C is carried downwardly with the hook 237 in the manner above described with respect to FIGURE 1, causing the tray in the cart basket to rise for unloading. After the tray is unloaded and the traveler 176C is returned to its uppermost position, the cart may be pushed forwardly against the hooked plate 230 causing same to pivot forwardly against the wall 164C of the check stand and allow forward movement of the cart out of the aisle 221.

Figure 13:
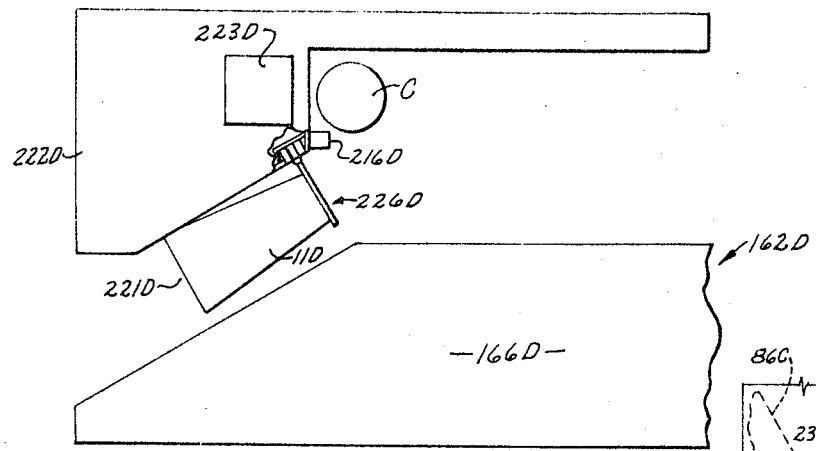
FIGURE 13 is a top diagrammatic view of a further modified check stand.

FIGURE 13 discloses another type of check stand construction, the general arrangement of which differs from that disclosed in FIGURE 12 above discussed. More particularly, the aisle 221D through which the shopping cart 11D passes, extends between the stand extension 222D supporting the cash register 223D and into the area occupied by the checker C. The countertop 166D for receiving merchandise from the cart is on the opposite side of the aisle 221D from the cash register 223D. The aisle 221D is provided with a hook construction 226D of the type described above with respect to FIGURE 12 and shown in FIGURES 14 and 15. Thus, the lift mechanism included in the embodiments of the invention shown can be utilized with a wide variety of existing or new check stand arrangements.

Figure 16:
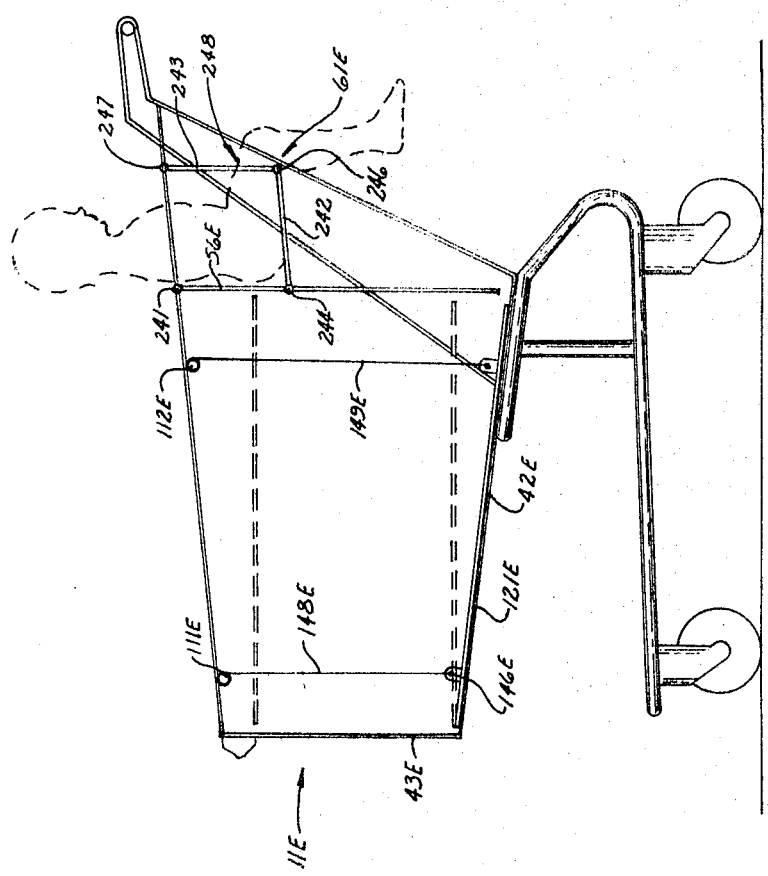
FIGURE 16 is a diagrammatic side elevational view of a modified cart embodying the invention.
Figure 17:
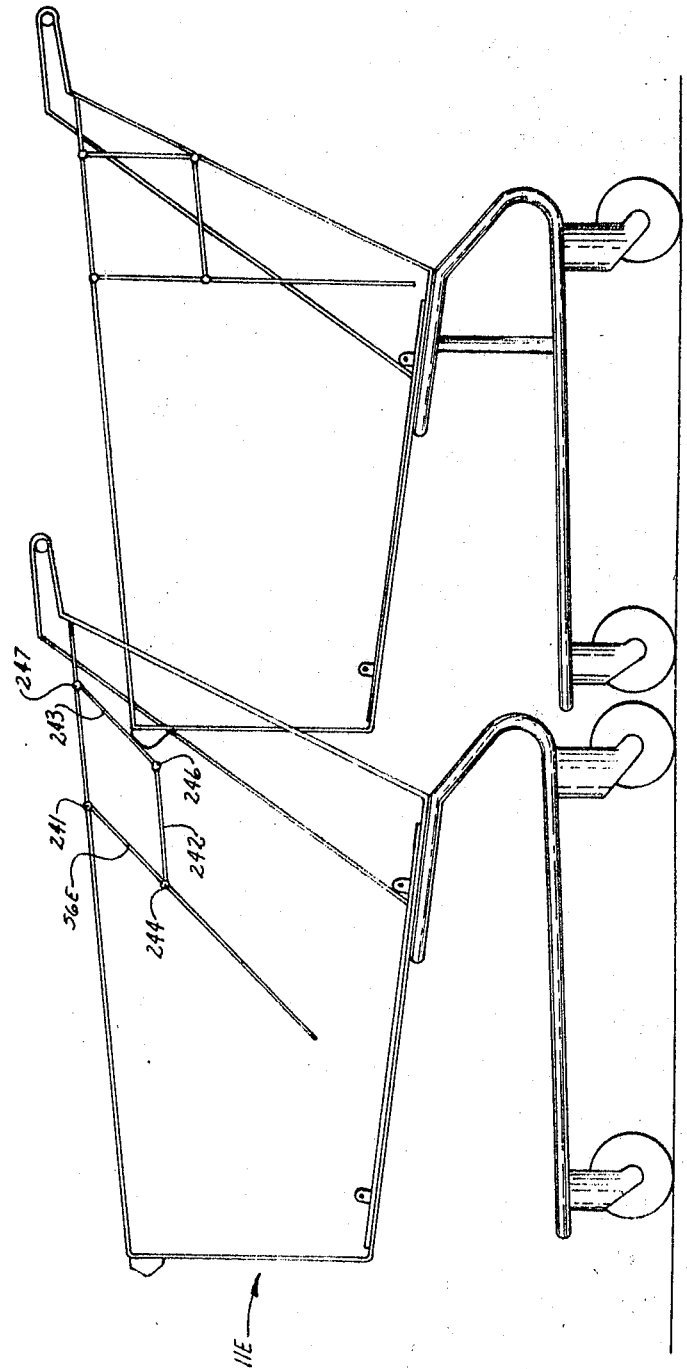
FIGURE 17 is similar to FIGURE 16 but showing the cart in its condition during the nesting operation.

FIGURES 16 and 17 diagrammatically disclose a modified shopping cart construction 11E generally similar to the cart construction 11 of FIGURE 1 with the following exceptions.

The gate 56E and the associated baby seat construction 61E differs substantially from those of the cart 11. Briefly, the gate 56E when in its closed position is essentially vertical. The gate 56E is pivoted at 241 on the side walls of the cart basket adjacent the top edge thereof. The pivots 241 are preferably essentially directly above the rearward edge of the bottom wall 42E of the basket. Thus, the gate 56E is essentially parallel to the front wall 43E of the basket. The gate 56E is arranged to swing only forwardly.

The baby seat construction 61E includes a seat panel 242 and a rearward panel 243. The seat panel 242 is pivotally mounted at 244 on the back of the gate 56E at a point spaced below the upper end thereof. The rear edge of the seat panel 242 is pivotally mounted at the lower edge of the rear panel 243 as indicated at 246. The rear panel 243 extends upwardly, is angled slightly rearwardly and is pivotally mounted at 247 adjacent the rearward upper edge of the basket.

The gate 56E and panels 242 and 243 are of any desired construction and may be of rod mesh construction similar to that of the gate 56 and baby seat 61 discussed generally above. The rear panel 243 is provided with suitable leg openings 248. Thus, a child seated on a seat panel 242 can extend his legs rearwardly out of the leg openings 248 and rest his back against the gate 56E above the seat panel 242. With the baby seat unoccupied, the cart 11E may receive a similar cart in nested relation therewithin. The cart to be nested is moved forwardly against the rear panel 243 as indicated in FIGURE 17 causing the rear panel 243 to swing forwardly. As a result, the seat panel 242 causes the gate 56E to swing forwardly and upwardly to allow nesting.

The cart 11E further differs from the cart 11 above described in that the cable reaches 148E and 149E extend vertically from the anchor members 146E of the tray 121E. As in the embodiment of FIGURE 1, the cable reaches 148E and 149E parallel the path of the tray 121E. The tray 121E does not have a flap as in the embodiment of FIGURE 1. Thus, it will be apparent that the baby seat remains in its open position for carrying a child except when another cart is nested in the cart 11E. Therefore, in contrast to the embodiment of FIGURE 1, a child can occupy the baby seat when the tray 121E is being raised and lowered and regardless of the position of the tray 121E.

FIGURES 18 through 20 disclose a modified cart construction in which the basket 11E is provided with guides 201 on each side thereof. The guides 201 extend from the bottoms to the tops of the basket side walls on the inner faces thereof. The guides 201 are riveted at their upper ends to the cable duct 81 and are fixed at their lower ends by any convenient means to the floor of the basket as indicated at 202. The guides 201 are generally C-shaped in cross section and have inwardly extending flanges 204 (FIGURE 23). The open side of the guides face inwardly of the basket. The guides 201 essentially parallel the gate 56G at the rear of the basket.

Slide elements 206 have heads 207 which are slideably guided within the guides 201. The slide elements 206 are transversely slideable in cylindrical sleeves 208 by welding to the upper face of the tray adjacent the forward end thereof and at the side edges thereof. It will be noted that the sides of the basket converge toward the front thereof to allow for nesting of a plurality of such carts. As a result of this and of the rearward slope of the guides 201, the guides diverge upwardly. The shanks of the slide elements 206 are long enough to allow their outward movement in the guides 208 as the heads 207 follow the guides 201 outwardly while the tray rises. Thus, the slide elements and guides positively control and rearward movement of the tray as it falls and rises, respectively. It will be noted that in this embodiment the rearward edge of the tray does not contact or interfere with the gate 56G nor does it depend upon the gate for determining its upward path.

Although particular preferred embodiments of the invention have been disclosed above for purposes of illustration, it will be understood that modifications or variations thereof are fully contemplated.

The embodiments of the invention in which an exclusive property or privilege is claimed are defined as follows:

1. In an unloading assistant for a shopping cart having an upwardly opening basket, the combination comprising:
   tray means disposed in the basket for supporting goods thereon;
   elevating means connected to said tray means and energizable for raising same in said basket to render goods supported thereon accessible for unloading;
   actuating means supported independently of said cart and releasably engageable with said elevating means for actuating same to raise said tray means; and
   governing means associated with said elevating means for varying the relative rate of rise of different portions of said tray means to vary the inclination of said tray means as it rises.

2. The device defined in claim 1, in which said basket is of the nesting type having a top pivoted, forwardly swingable rear wall and a rearwardly sloped bottom wall to allow telescoped introduction thereinto of the front end of a further cart basket and in which said tray means rests in a sloped condition on said sloped bottom wall, said governing means causing the rear end of said tray means to rise more rapidly than the front end thereof during the initial rise of said tray means to level said tray means and thereafter allow said rates of rise to become closer.

3. In an unloading assistant for a shopping cart having an upwardly opening basket, the combination comprising:

tray means disposed in the basket for supporting goods thereon;

elevating means connected to said tray means and energizable for raising same in said basket to render goods supported thereon accessible for unloading, said elevating means including tension elements affixed to said tray means at spaced points thereon and extending substantially upwardly therefrom, said elevating means further including means directing said tension elements along the walls of the basket; and actuating means supported independently of said cart and releasably engageable with said tension elements for actuating same to raise said tray means.

4. In an unloading assistant for a shopping cart having an upwardly opening basket with a pair of opposed, generally upstanding end walls, at least one of which is sloped divergently away from the other, the combination comprising:

tray means disposed in the basket for supporting goods thereon;

elevating means connected to said tray means and energizable for raising same in said basket to render goods supported thereon accessible for unloading, said elevating means including a plurality of generally parallel tension elements affixed to said tray means parallel to one of said end walls of said basket, whereby said tray means slides upwardly along said one end wall independently of said other end wall; and actuating means supported independently of said cart and releasably engageable with said tension elements for actuating same to raise said tray means.

5. In an unloading assistant for a shopping cart having an upwardly opening basket for use at a check stand, the combination comprising:

a tray disposed in the basket for supporting goods thereon;

a plurality of elongated flexible elements connected to said tray for raising and lowering same in the basket;

guide means fixed with respect to the basket above the tray for leading said elements to a common zone;

a first coupling element fixed with respect to said elements in said zone and extending from the cart basket;

a second coupling element and means supported on the check stand actuable for moving said second coupling element along a preset path into engagement with said first coupling member when the cart is disposed adjacent said check stand to raise said tray and thereby to assist unloading of said goods from said cart.

6. The device defined in claim 5, including guides disposed beside the tray and affixed to the side walls of the basket and slide means secured to the tray and slideably engaged in the guides for determining the forward-rearward position of the tray as it is raised in the basket.

7. The device defined in claim 6, in which the side walls of the basket diverge upwardly, in which the guides are sloped upwardly and rearwardly and parallel the basket side walls and in which the slide means of the tray are free to move transversely with respect thereto while retaining contact therewith to follow the outward divergence of the guideways while moving upwardly with the tray.

8. The device defined in claim 6, in which the slide means associated with the tray are pins slideably disposed in transversely aligned shells affixed to the tray, in which said guides are of substantially channel shaped cross section having overhung flanges opposed to the tray and in which said slide means have enlarged heads disposed within the channel cross section of said guide and prevented from transversely escaping therefrom by said flanges.

9. The device defined in claim 5, in which said flexible elements comprise a pair of elongated cables, said cables being disposed on opposite sides of said cart basket, the ends of each said cable connecting fixedly to the corresponding side of said tray adjacent the forward and rearward ends thereof, said first coupling element extending transversely of said basket in said zone, the intermediate portions of said cables being led through said guide means from said tray to said first coupling element and being fixed thereto at transversely spaced points thereon.

10. The device defined in claim 5, in which said guide means comprise a generally U-shaped cable duct having a midportion extending transversely across the front wall of the cart basket at the upper end thereof and having leg portions extending therefrom along the side walls of the cart basket adjacent the top edges thereof, each of said legs having the spaced pair of openings in the inner wall thereof for admitting said flexible elements into said duct and supporting pulleys at said openings for guiding said elements, said ducts further including roller means at the corners of said duct on which said elements ride and a pair of spaced rollers disposed in the midportion of said duct for directing said elements downwardly, said duct having an outlet opening below said pair of rollers for allowing said cables to exit from said duct, said first coupling element being disposed in front of the basket and beneath said outlet opening in said duct and pendently supported upon said elements.

11. The device defined in claim 5, including a cover member fixed to the front basket wall in front of said duct for preventing forward movement of the duct off the basket, said cable duct including a plurality of tabs impressed through the side walls of said cart basket in interlocking relationship with said walls for assisting said cover member in preventing forward movement of said duct off said cart, said duct being vertically held to said cart by means on the exterior surface of said side walls of said cart basket above and below said duct and in vertically interferring relationship therewith, said check stand supporting member bumper means in opposed relationship to said cover member to limit movement of said cart toward said check stand in a manner to bring said first and second coupling elements into vertically aligned relationship, said cover member further having an opening through the bottom thereof through which said first coupling element loosely extends.

12. The device defined in claim 9, in which the reaches of said cables attached to one end of said tray extend downwardly from said rollers to said first coupling element and in which said reaches of said cables attached to the other end of said tray extend horizontally toward each other from said rollers and are rigidly fixed to each other intermediate said rollers and extend downwardly to fixed contact with said first coupling element, downward movement of said first coupling member causing a corresponding longitudinal displacement of said reaches from said one tray and an angular displacement of said reaches from said other tray end combined with a lesser longitudinal displacement so that said other tray end is intially raised to a lesser extent than said one tray end.

13. A shopping cart construction comprising:

wheel-supported frame means and a basket having bottom, front and side walls supported on said frame means;

a gate adapted to alternatively open and close the rearward end of said basket and pivotally supported at its upper ends on said side walls;

a baby seat construction including a first panel pivotally attached to the bottom of said gate, located in front of said gate and foldable forwardly away from said gate into upwardly converging relationship with said front wall, said baby seat construction further including means defining a seat disposed between said first panel and said gate in folding relationship with one thereof and means responsive to weighting of said seat for locking said first panel in a forwardly spaced position away from said gate;

a tray disposed within said basket and resting upon the bottom wall thereof, said tray substantially covering said bottom wall, and means for raising and lowering said tray, said tray including means for engaging said first panel of said baby seat construction for swinging said first panel toward said gate to close said baby seat construction upon lifting of said tray off the bottom of said basket.

14. The device defined in claim 5, in which said means supported on the check stand comprises a rotative power source driving said second coupling element, means responsive to the position of said second coupling element on said preset path for limiting further movement of said coupling means in a given direction along said path and further means manually actuable for de-energizing said power source.

15. The device defined in claim 14, in which said means for limiting movement of said second coupling element along said preset path comprises a shaft rotatably driven from said power source in positive relation to second coupling elements;

traveling means supported on said shaft and responsive to rotation thereof for traveling axially therealong in a direction dependent upon the direction of rotation thereof;

a pair of actuating members on said traveling means disposed adjustably with respect thereto in the direction of movement of said traveler means; and a limit switch actuable by said actuating members in response to contact therewith, said limit switch being connected in circuit with said motor for causing same to discontinue propulsion of said second coupling element in a given direction upon contact of said limit switch with one of said actuating elements.

16. The device defined in claim 5, in which said means supported on said check stand includes a vertically extending track fixed to one wall of said check stand, a traveler block slidably supported on said track for vertical movement therealong, said second coupling element being fixed to said traveler block, and in which said first coupling element is disposed on the front wall of said basket.

17. The device defined in claim 16, in which said vertical track is disposed at one end of the check stand and said second coupling means comprises a laterally extended downwardly opening hook of width sufficient to engage said first coupling means when said cart is centered on said track with loose limits, whereby movement of said basket longitudinally of said check stand into contact with said one end allows said second coupling element to be moved downwardly into contact with said first coupling element to raise said tray.

18. The device defined in claim 16, in which said second coupling element comprises hinge means having a vertical axis and fixed to said traveler block, said second coupling element further including an elongated plate extending horizontally away from said hinge axis and being affixed to said hinge means for pivotal movement with respect to said traveler block, said elongated plate having a downwardly opening hook extending therealong for engagement with said first coupling element whereby downward movement of said traveler causes said hook to engage said first coupling element and draw same downwardly for raising the tray in said basket.

19. The device defined in claim 18 in which said hinge means comprises two parts having interfingered curled portions pivotally joined by a hinge pin, a curled portion of the one of said hinge parts secured to said traveler block, the adjacent curled portion of the hinge part carrying said hook, other adjacent ones of said curled portions of said hinge parts being spaced from each other, said one curled portion being provided with a smoothly curved recess in the upper edge thereof and the curled portion supported thereby being provided with a smoothly curved downwardly extending portion receivable in said recess when said hook extends at right angles to said check stand wall to hold said hook so positioned and being responsive to a horizontal force on said hook to allow said hook to swing toward said check stand wall out of the way of the cart.

20. In an unloading assistant for a shopping cart having an upwardly opening basket equipped with a peripheral wall, the combination comprising:

a tray disposed in the basket for supporting goods thereon;

lift means for guiding said tray along a path sloped upwardly away from one position of said peripheral wall of said basket and for raising and lowering said tray along said path;

a panel carried by said tray and foldable with respect thereto, said panel being opposed to said one portion of said one peripheral wall and extending thereto to bridge the space between said tray and one peripheral wall portion as the tray is raised; and side rails upstanding from said tray and extending along the length of the edges thereof, the forward ends of said side rails being disposed immediately behind the lower portion of said foldable panel for preventing said panel from folding inwardly onto said tray and for holding said panel generally in an upright position when said tray rests on the bottom of said basket, said means including means for initially tilting said tray forwardly as it is raised from the bottom of said basket to cause said panel to fall outwardly against said one peripheral wall portion and to follow said wall portion upwardly as said tray rises.

References Cited

UNITED STATES PATENTS

| 1,279,089 | 9/1918 | Dolbear | 214—17 |
| 3,028,931 | 4/1962 | Donovan | 186—1 |
| 3,083,791 | 4/1963 | Shoffner | 186—1 |
| 3,196,984 | 7/1965 | Stout | 186—1 |

ROBERT G. SHERIDAN, Primary Examiner

U.S. Cl. X.R.

214—44, 82; 280—33.99